United States Patent
Lee

(10) Patent No.: US 6,871,144 B1
(45) Date of Patent: Mar. 22, 2005

(54) COMBINED GLOBAL POSITIONING SYSTEM RECEIVER AND RADIO WITH ENHANCED TRACKING FEATURES

(75) Inventor: Wai C. Lee, Olathe, KS (US)

(73) Assignee: Garmin Ltd. (KY)

(*) Notice: Subject to any disclaimer, the term of this patent is extended or adjusted under 35 U.S.C. 154(b) by 0 days.

(21) Appl. No.: 10/096,676

(22) Filed: Mar. 13, 2002

(51) Int. Cl.$^7$ .............................. G01C 21/26; G01S 1/08
(52) U.S. Cl. ..................... 701/213; 455/456.1; 455/90; 340/539.32; 340/995; 342/357.1
(58) Field of Search .................. 340/990, 825.36, 340/539.32, 995.1, 995, 988, 989, 825.72, 693.5, 995.2; 342/357.09, 357.06, 357.1, 419, 120, 357, 357.14, 357.08, 357.13; 701/300, 224, 213, 200, 207, 24, 211, 217; 455/456.1, 446, 90, 41, 66, 404, 456, 3.01, 404.1; 348/117; 345/169

(56) References Cited

U.S. PATENT DOCUMENTS

| | | | | |
|---|---|---|---|---|
| 4,296,408 A | * | 10/1981 | Neuringer ............... 340/539.13 |
| 5,043,736 A | | 8/1991 | Darnell et al. ............... 342/357 |
| 5,689,269 A | | 11/1997 | Norris ........................ 342/357 |
| 5,689,809 A | | 11/1997 | Grube et al. ................ 455/54.1 |
| 5,781,150 A | | 7/1998 | Norris ........................ 342/357 |
| 5,786,789 A | * | 7/1998 | Janky ....................... 342/357.1 |
| 5,831,545 A | * | 11/1998 | Murray et al. ............. 340/7.27 |
| 5,848,373 A | | 12/1998 | DeLorme et al. ........... 701/200 |
| 5,952,959 A | | 9/1999 | Norris ........................ 342/357 |
| 6,002,982 A | | 12/1999 | Fry ............................ 701/213 |
| 6,011,510 A | * | 1/2000 | Yee et al. ............... 342/357.09 |
| 6,148,262 A | | 11/2000 | Fry ............................ 701/213 |
| 6,347,278 B2 | * | 2/2002 | Ito ............................. 701/200 |
| 6,366,771 B1 | * | 4/2002 | Angle et al. .............. 455/414.1 |
| 6,373,430 B1 | * | 4/2002 | Beason et al. .......... 342/357.09 |
| 6,434,485 B1 | * | 8/2002 | Beason et al. .............. 701/213 |
| 6,496,709 B2 | * | 12/2002 | Murray ..................... 455/569.1 |
| 6,646,603 B2 | * | 11/2003 | Dooley et al. .............. 342/458 |
| 6,765,528 B2 | * | 7/2004 | Tranchina et al. ......... 342/357.1 |
| 6,791,477 B2 | * | 9/2004 | Sari et al. ............... 340/825.36 |
| 2002/0004704 A1 | * | 1/2002 | Nagatsuma et al. ........ 701/213 |
| 2002/0006806 A1 | * | 1/2002 | Kinnunen et al. .......... 455/550 |
| 2002/0049529 A1 | * | 4/2002 | Ikeda ......................... 701/200 |
| 2002/0063655 A1 | * | 5/2002 | Aoyama ................ 342/357.13 |
| 2002/0102989 A1 | * | 8/2002 | Calvert et al. .............. 455/456 |
| 2002/0128774 A1 | * | 9/2002 | Takezaki et al. ............ 701/211 |
| 2002/0173909 A1 | * | 11/2002 | Verbil ........................ 701/213 |
| 2002/0193945 A1 | * | 12/2002 | Tan et al. ................... 701/213 |
| 2002/0198020 A1 | * | 12/2002 | Mooney ..................... 455/553 |
| 2002/0198659 A1 | * | 12/2002 | Doyle et al. ................ 701/300 |
| 2003/0080897 A1 | | 5/2003 | Tranchina et al. |

FOREIGN PATENT DOCUMENTS

DE       004320976 A1  *  1/1995

* cited by examiner

Primary Examiner—Thomas G. Black
Assistant Examiner—Tuan C To
(74) Attorney, Agent, or Firm—Devon A. Rolf

(57) ABSTRACT

A portable GPS unit (10) communicates over a wireless radio network (12) with at least one other such unit (10A–10E). The unit (10) may transmit radio signals over the network (12) indicative of the unit's location and receive similar radio signals from the other units (10A–10E). The unit (10) is operable to calculate and display a route that may be followed to go to a moving waypoint such as one of the other units (10A–10E).

34 Claims, 4 Drawing Sheets

COMBINED GLOBAL POSITIONING SYSTEM RECEIVER AND RADIO WITH ENHANCED TRACKING FEATURES

BACKGROUND OF THE INVENTION

1. Field of the Invention

The present invention relates to radios and global positioning system (GPS) receivers. Moore particularly, the invention relates to a combined GPS receiver and radio unit operable for sending and receiving GPS-derived location data and other information and for providing tracking information that permits a user to follow or go to another user.

2. Description of the Prior Art

The global positioning system (GPS) is an electronic satellite navigation system which permits users to determine their position with respect to the Earth. Global positioning may be determined with a handheld GPS receiver which detects and decodes signals from a number of satellites orbiting the Earth. The signals from each of these satellites indicate the position of the satellite and the time at which the signals were sent. To decode the satellite signals, known as spread spectrum signals, and thereby calculate desired position and navigational data, a GPS receiver must first "find" or acquire the signals emitted from a minimum number of satellites. Once the receiver is "locked on" to the spread spectrum signals, the user's global position and other navigational data (e.g., velocity of movement) can be calculated.

In addition to the growing popularity and demand for GPS navigational devices, portable two-way radios continue to enjoy widespread popularity. In 1996, the Federal Communications Commission (FCC) established the Family Radio Service (FRS) so that families and other small groups could communicate with one another over very short distances (typically less than two miles) at no charge and without an FCC license. The FRS, which is one of the Citizens Band Radio Services, includes 14 channels in the UHF 465 MHz band. There are a number of commercially available two-way radios which are designed for use with the FRS.

The increasing use of both portable radios and GPS receivers has led to proposals to incorporate the two into combined units. It is anticipated that such combined units will provide enhanced capabilities such as the ability to transmit GPS-derived location data between two or more units so that the users of the units may monitor each other's location. For example, a family may use several of these combined units to not only communicate with one another but also to monitor each other's location so that parents may keep track of their children.

Unfortunately, currently-proposed combined GPS/radio units and GPS receivers in general suffer from several limitations that limit their utility. For example, although current GPS receivers are operable for determining their own locations and for providing directions or proposed routes to fixed locations, they are not operable for providing directions or proposed routes to moving waypoints such as other portable GPS units whose locations frequently change. This is a problem because GPS users often desire continuous navigation information on a moving target. For example, a driver of a vehicle equipped with a GPS unit may wish to follow or go to a driver of another moving vehicle equipped with a GPS unit or a hiker carrying a portable GPS unit may wish to follow or go to another hiker carrying a portable GPS unit.

SUMMARY OF THE INVENTION

The present invention solves the above-described problems and provides a distinct advance in the art of GPS receivers by providing a GPS unit that allows a user to follow or go to a moving waypoint such as another GPS unit positioned in a car or other vehicle or carried by a hiker, biker, runner, or other person.

The preferred GPS unit broadly includes a GPS receiver for receiving satellite signals from a plurality of satellites; a radio receiver operable for receiving location data indicative of a location of a moving waypoint such as another GPS unit carried by a person; a processor coupled with the GPS receiver and the radio receiver for calculating a route that may be traveled by the GPS unit to follow or go to the moving waypoint as a function of the satellite signals and the location data; and a display coupled with the processor for displaying the route.

In preferred forms, the processor is operable to continuously analyze the heading and/or the speed of the moving waypoint and to take into account fixed obstacles such as bodies of water and dead end streets when calculating the route to the moving waypoint. This allows a user of the GPS unit to actually go to where the moving waypoint is heading, not just where it was previously located. This feature is especially desirable in search and rescue and law enforcement applications. For example, in a search and rescue application, a rescuer may operate the GPS unit to determine the best possible route to intercept an injured or lost person who is carrying another GPS unit. By taking into account the other person's current heading and speed, the GPS unit operated by the rescuer can calculate an intercept route that allows the rescuer to reach the person in the least amount of time.

Another important aspect of the present invention is that, when location data indicative of a location of a moving waypoint is received by the GPS unit, the data is not merely displayed for viewing, but instead inherits the characteristics of a waypoint. By virtue of these inherited "waypoint" characteristics, the unit can navigate or "go" to the waypoint, view the location of the waypoint on a map, display a bearing and distance to the waypoint, rename the waypoint and store the new name in memory, and transmit the data to a personal computer or other computing device for performing certain waypoint management functions. Moreover, as the moving waypoint continues to move and transmit new location data to the GPS unit, the GPS unit not only provides an updated indication of the new location of the moving waypoint but also automatically considers the updated location data when performing the navigation and waypoint management functions discussed above. Updated location data received by the GPS unit is stored in such a way that it may be accessed by the navigation algorithms and waypoint functions of the GPS unit, not merely displayed on the unit. Accordingly, the GPS unit of the present invention receives updatable and more usable location data for moving waypoints, not just static location data.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

Figure 1:
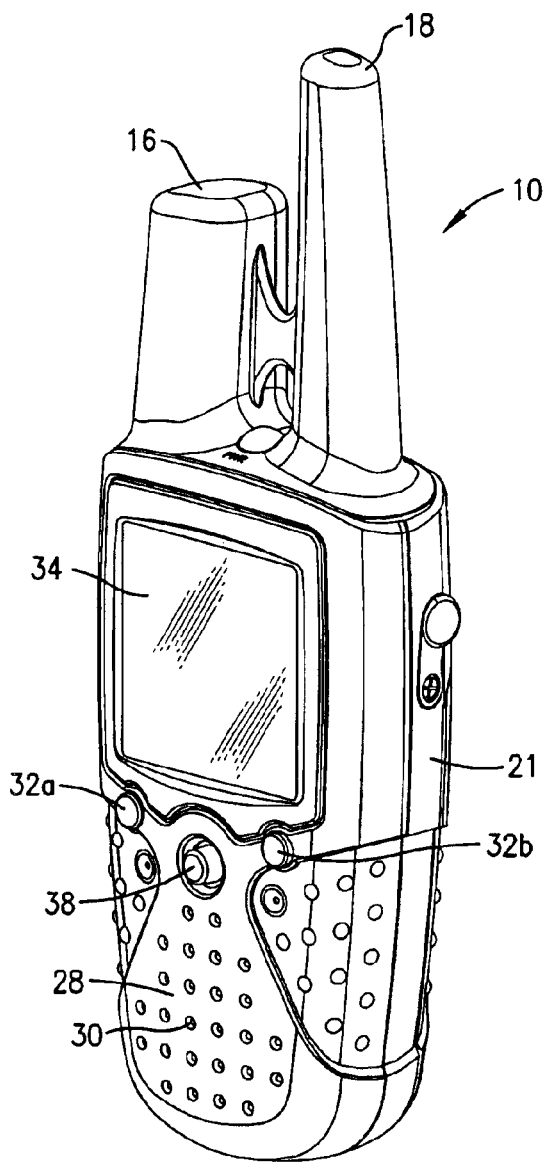
FIG. 1 is a perspective view of a combined GPS/radio unit constructed in accordance with a preferred embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

Figure 3:
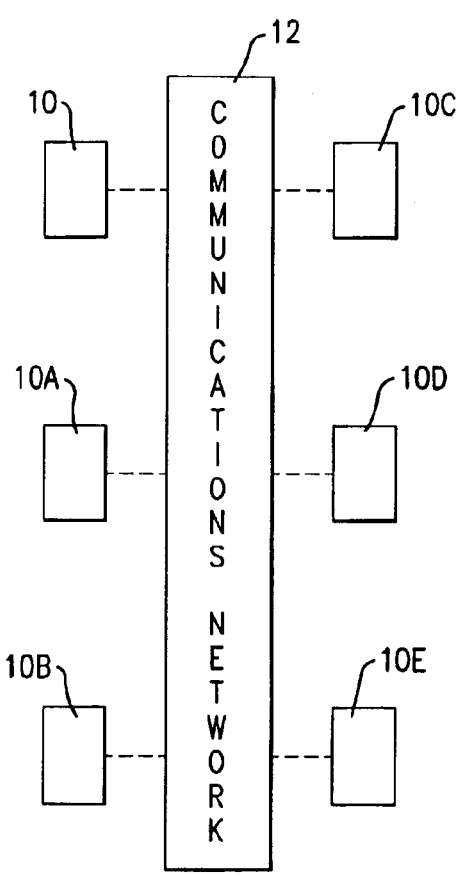
FIG. 3 is a block diagram of a communications network linking the GPS/radio unit of FIG. 1 with a plurality of other GPS/radio units.
Figure 2:
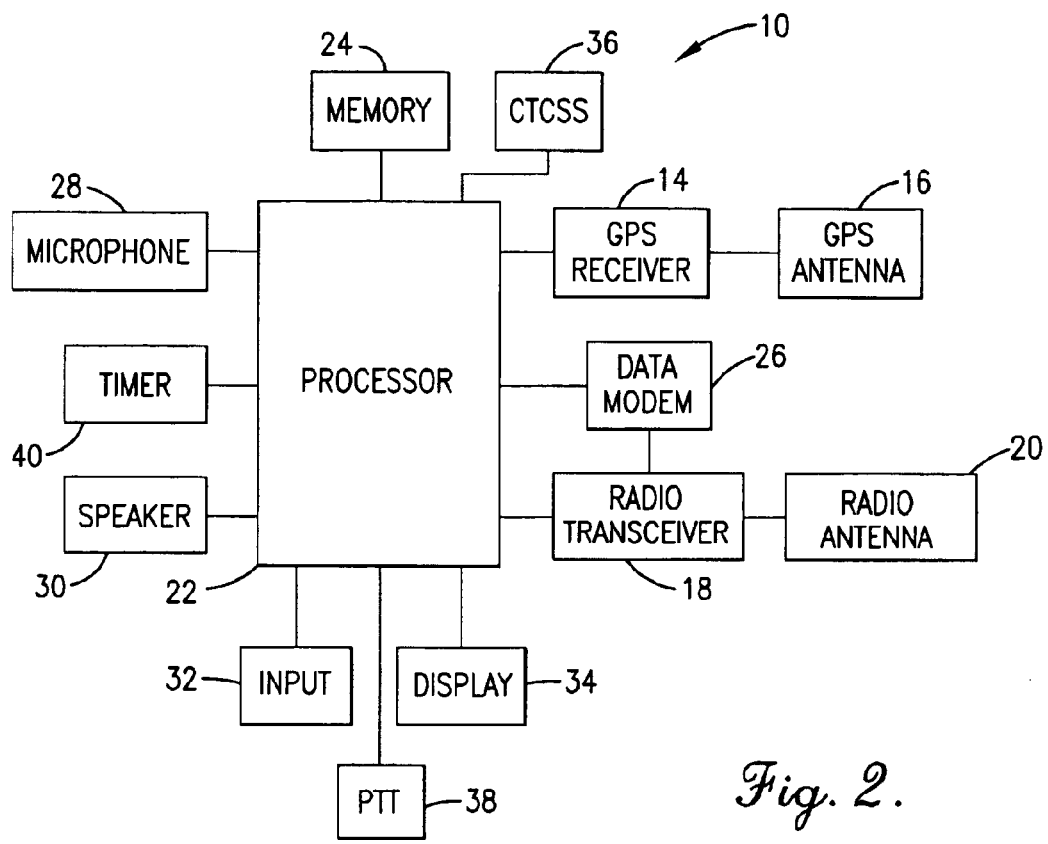
FIG. 2 is a block diagram of the components of the GPS/radio unit of FIG. 1.

Turning now to the drawing figures, and particularly FIGS. 1-3, a portable GPS unit 10 constructed in accordance with a preferred embodiment of the invention is illustrated. The unit 10 is preferably a combined GPS/radio unit that may transmit and receive voice communications, determine its location unit the GPS, and transmit location data and other information to other such units 10A, 10B, 10C, 10D and 10E over a wireless network 12. In the preferred embodiment of the present invention, the wireless network 12 is a public radio network such as the Family Radio Service (FRS); however, it may also be a cellular radio network, a personal communications service (PCS) network, or any other conventional wireless communications network. While six units 10 and 10A–10E are shown on the exemplary embodiment of FIG. 3, only two such units are necessary for the purposes of the present invention.

Referring to FIGS. 1 and 2, the preferred unit 10 comprises a GPS receiver 14, a GPS antenna 16, a radio transceiver 18, and a radio antenna 20 all mounted in or on a radio housing 21. The GPS receiver 14 is electronically coupled with a processor 22 which has an associated memory 24 for storing information such as cartographic data (i.e., electronic maps). Similarly, the radio transceiver 18 is coupled with the processor 22 and a data modem 26. The data modem is used for transmitting and receiving data such as location data as described herein. The cartographic data may be stored on cartridges which can be removably attached to the unit 10. For example, an electronic map of a particular city or national park may be stored in a single cartridge. The memory 24 may also store historical location data for the unit 10 or for other units which have transmitted location data to unit 10. The antennas 16, 20 preferably extend upwardly from the top of the housing 21.

The unit 10 also includes a microphone 28, a speaker 30, an input 32, and a display 34. The microphone 28 and the speaker 30 are conventional and may be, for example, the same type of microphone and speaker equipped with a standard FRS radio. The display 34 is preferably a liquid crystal display (LCD) and is used to display location information and cartographic data as described in more detail below.

The input 32 may be an alphanumeric keypad (not shown), such as a telephone keypad which may be used to type in names, identifiers, and text or a plurality of control buttons (32a, 32b in FIG. 1), which may be used to operate drop-down menus to select and input names or other identifiers. The input 32 may include any number of control buttons such as the twelve buttons standard on a telephone keypad. As will be understood, the input 32 could be something other than a keypad or control buttons, such as a microphone/voice recognition input, a touch screen, or a menu-driven display input.

The unit 10 may also include a continuous tone coded squelch system (CTCSS) 36 that controls the audio output of the speaker 30 so that only certain desired communications are heard by a user of the unit 10. The CTCSS 36 includes circuitry for creating a plurality of sub-audible tones and a selector for selecting one of the tones. The selector may be a key or button on the input 32 or a dedicated key or button positioned elsewhere on the unit 10. When enabled, the CTCSS 36 transmits the selected sub-audible tone with all voice communications. Other nearby units 10A–10E will receive the sub-audible tone along with all transmitted voice communications and disable their squelch if they have a similar CTCSS 36 that has been set to the same sub-audible tone. This allows a group of users to set their units to the same sub-audible tone and then communicate with one another without hearing communications transmitted by radios with a different or no CTCSS 36 sub-audible tone.

The unit 10 also preferably includes a push-to-talk button 38 such as those normally found on FRS radios. The push-to-talk button 38 may be coupled with the processor 22 to both initiate transmission of voice communications and transmission of location data such as a GPS-derived location of the unit. Transmission of such location data may also be initiated by the control buttons 32a, 32b.

The unit 10 may also include a timer 40 or other counting device that counts the amount of time that has elapsed since location data was last received from other such units. The timer 40 may be a stand-alone timing or counting device coupled with the processor 22 or may be integral to the processor 22.

In use, the unit 10 communicates with other GPS/radio units (e.g., units 10A–10E) over the wireless network 12 in the same manner that conventional two-way radios communicate with one another. In addition, these units are able to calculate their location and communicate that location data to one another since they are also equipped with GPS receivers. Transmission of the location data may be triggered by the push-to-talk button 38 as described above. Another way to communicate the location data over the wireless network 12 is to divide the available bandwidth into a voice portion and a data portion so that voice and data may be communicated simultaneously. If only a small portion of the bandwidth is allocated for data transmission, there should be no noticeable degradation of the voice communication. Alternatively, the entire communication channel could be used for voice communication except for periodic interruptions during which a burst of location data is sent. If the period of the interruption is short, there should be no noticeable effect on the quality of the voice communication. The data may be transmitted using one of a variety of different modulation techniques, including frequency shift keying (FSK), minimum shift keying (MSK), or phase shift keying (PSK).

Figure 4:
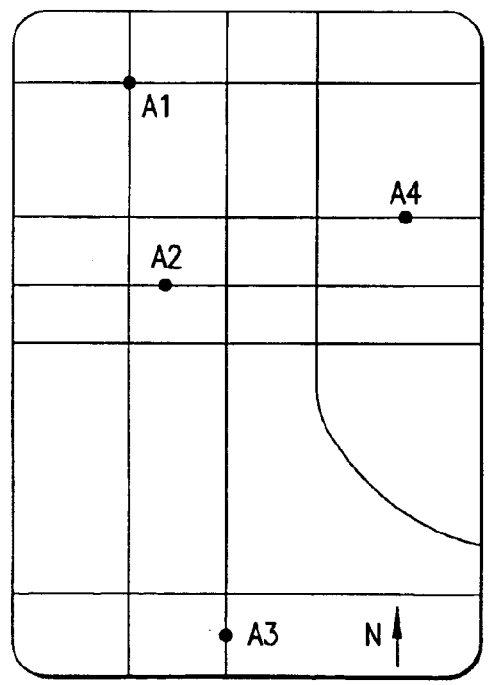
FIG. 4 is a schematic representation of a display on the GPS/radio unit of FIG. 1, wherein the display indicates the location of multiple GPS/radio units on an electronic map.

FIG. 4 is a schematic representation of an exemplary display 34 on the unit 10 in which the display 34 indicates the location of four different GPS/radio units. Although darkened circles are used in FIG. 4 to indicate the location of the four units, any other location designator could be used. The display 34 also indicates a unique alphanumeric identifier for each of the four units. For example, the identifiers A1, A2, A3, and A4 may correspond to units 10, 10A, 10B, and 10C, respectively. While alphanumeric identifiers were selected in the example of FIG. 4, any available identifier (or combination of identifiers) could be used (e.g., letters, numbers, symbols, icons, colors, etc.) for the units. Moreover, an identifier could perform the dual function of identifying the unit and of indicating the location of the unit, thus eliminating the need for a darkened circle or other such location designator.

In accordance with an important aspect of the present invention, each of the units 10 and 10A–10E is also operable to calculate and display a route, directions, or instructions that may be followed to go to or follow a user of another unit. For example, if a user of the unit 10 desires to follow a user of the unit 10A, the unit 10 calculates a route between the unit 10 and the unit 10A and displays the same on the display 34. As used herein, the term "route" means a route, directions, instructions, or any other means for directing a user of one of the units 10, 10A–10E to follow or go to a user of another unit.

To accomplish the foregoing, the processor 22 is operable to analyze the location of the unit 10 as determined by the GPS signals and the location of another unit such as unit 10A based on the location data received therefrom. The processor 22 then calculates a route that may be followed by the unit 10 to go to or follow the unit 10A and displays this information on the display 34. The processor 22 may access the cartographic data in the memory 24 to determine the best route. For example, when determining the best route, the processor may consider certain dead end streets or other obstacles that should be avoided as indicated by the cartographic data.

Figure 5:
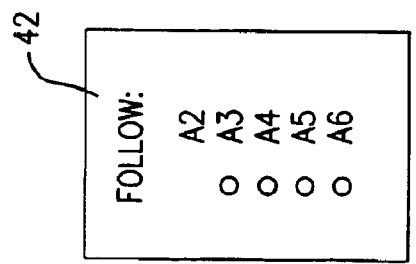
FIG. 5 is a schematic representation of a drop-down menu or other display interface which may be used to select another unit to track or follow.

The unit 10 and the other units 10A–10E are also each preferably programmed to include a display interface such as a drop-down menu 42 depicted in FIG. 5 which permits a user to select which of the other units to follow or go to. As illustrated, a user of the unit 10 (identified by A1) may choose to follow or go to any of the other units 10A–10E, identified by A2, A3, A4, A5, and A6, respectively, by selecting the desired unit in a conventional manner. For example, FIG. 5 depicts that a user of the unit 10 (identified by A1) wishes to follow the user of the unit 10A (identified by A2).

Figure 6:
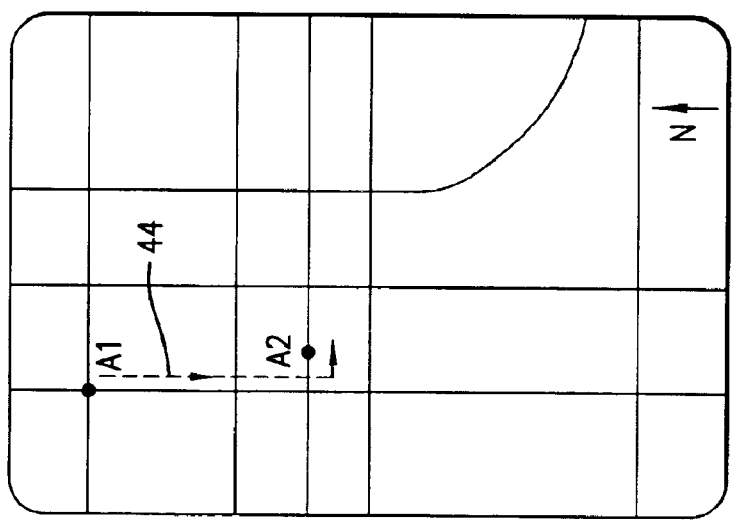
FIG. 6 is a schematic representation of a display on the GPS/radio unit of FIG. 1, wherein the display indicates the location of the unit and another unit and a route, directions, or instructions that assist the user of the unit to track or follow the other unit.

Continuing this example, FIG. 6 illustrates an exemplary display 34 on the unit 10 in which the display 34 indicates the location of the unit 10 (A1) and the location of unit 10A (A2). The display also indicates a route 44 calculated by the processor 22 that may be followed by the unit 10 to follow or go to the unit 10A. The route 44 may be in the form of a dashed line with arrows as depicted, text or symbols which instruct the user of the unit 10 which direction to travel, or any other means of conveying a recommended direction of travel for the unit 10 to follow or go to the unit 10A.

Figure 7:
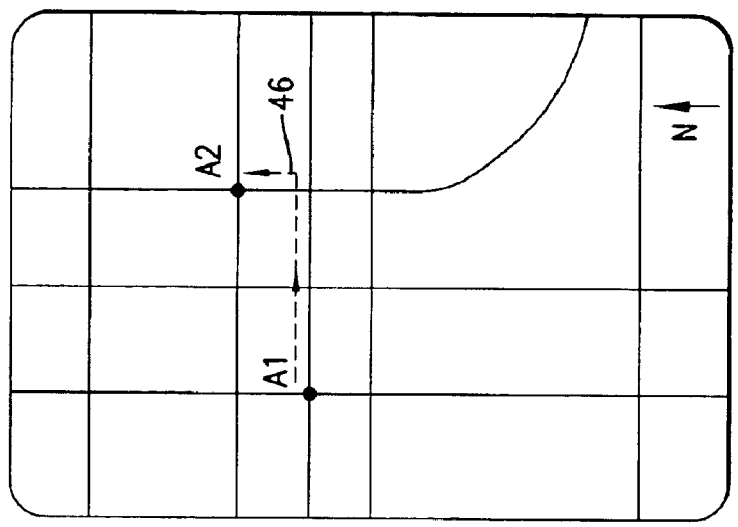
FIG. 7 is a schematic representation of a display on the GPS/radio unit of FIG. 1, wherein the display indicates the location of the unit and another unit and a route, directions, or instructions that assist the user of the unit to track or follow the other unit.

In accordance with another important aspect of the present invention, each unit 10, 10A–10E is also preferably operable to periodically recalculate a new route to another unit to account for relative movement between the units. For example, as depicted in FIG. 6, the processor 22 may initially calculate and display the route 44, which instructs the user to head south and then east to follow or go to the user of the unit 10A. However, if the user of the unit 10A begins heading north as depicted in FIG. 7, the processor 22 preferably calculates a new route 46 that instructs the user of the unit 10 to head east and then north to follow or go to the user of the unit 10A.

In accordance with another aspect of the present invention, each unit 10, 10A–10E is also preferably operable to calculate an anticipated or estimated route to another unit based upon the current speed and/or heading of the other unit. To accomplish this, the processor 22 of one unit, such as unit 10, may analyze the location data received from another unit, such as unit 10A, and compare it to previously received location data to calculate the speed and anticipated heading of the unit 10A. The processor 22 then calculates an anticipated or estimated intercept route that may be followed by the unit 10 to intercept or meet the unit 10A in the least amount of time. This feature is especially useful in search and rescue operations and law enforcement applications. For example, in a search and rescue application, a rescuer may operate the unit 10 to determine the best possible route to follow to intercept an injured person who is carrying the unit 10A. By taking into account the injured person's current heading and speed, the GPS unit 10 operated by the rescuer can calculate an intercept route that allows the rescuer to reach the injured person in the least amount of time.

Figure 9:
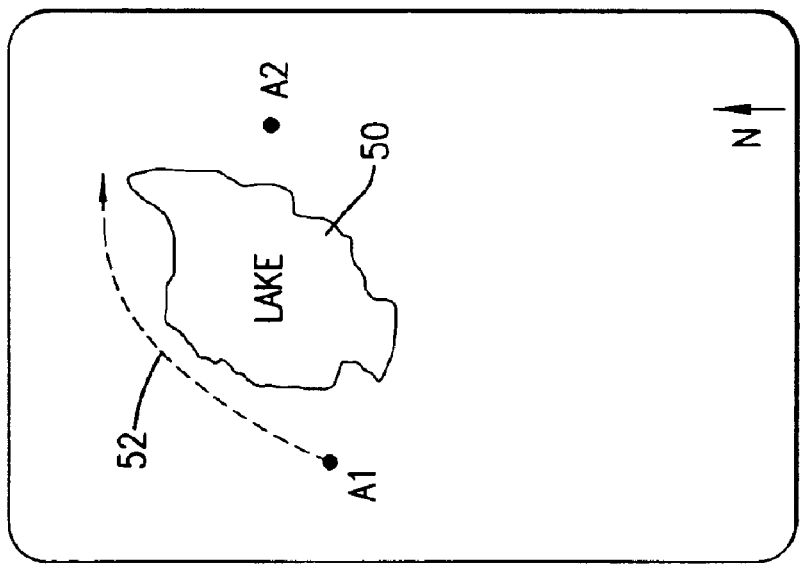
FIG. 9 is a schematic representation of a display on the GPS/radio unit of FIG. 1, wherein the display indicates the location of the unit and another unit and a route, directions, or instructions that assist the user of the unit to track or follow the other unit.
Figure 8:
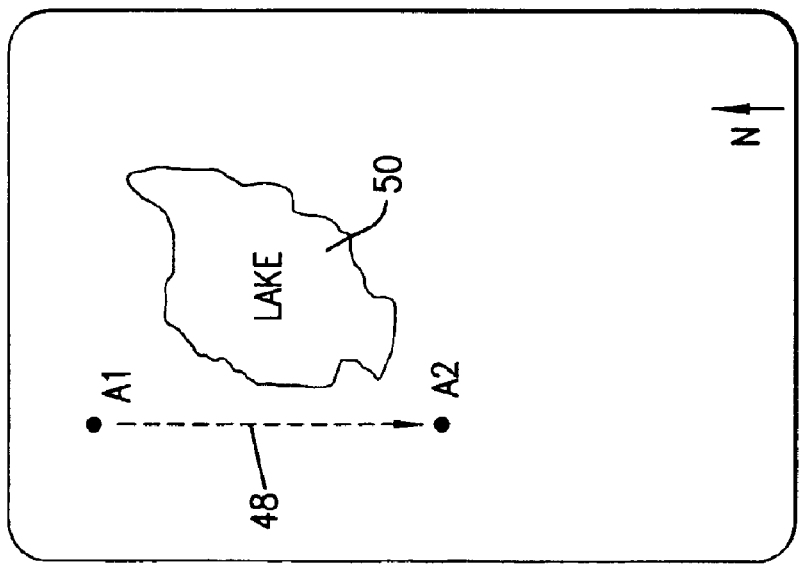
FIG. 8 is a schematic representation of a display on the GPS/radio unit of FIG. 1, wherein the display indicates the location of the unit and another unit and a route, directions, or instructions that assist the user of the unit to track or follow the other unit.

Each of the units 10, 10A–10E may also take into account fixed obstacles when determining a route to another unit. For example, as depicted in FIG. 8, the processor 22 of unit 10 may initially calculate and display a route 48 which instructs the user to head south along the shore of a lake 50 to follow or go to a user of the unit 10A. However, as depicted in FIG. 9, if the user of the unit 10A subsequently heads east and then north, the processor 22 calculates and displays a new route 52 that instructs the user of the unit 10 to head north and then east to account for the lake 52 which is now between the two units. As described above, the processor 22 may also take into account the current heading and speed of the unit 10A when calculating the new route.

Another important aspect of the present invention is that, when location data indicative of a location of a moving waypoint such as unit 10A is received by the GPS unit 10, the data is not merely displayed for viewing, but instead inherits the characteristics of a waypoint. By virtue of these inherited "waypoint" characteristics, the unit 10 can navigate or "go" to the unit 10A, view the location of the unit 10A on a map, display a bearing and distance to the unit 10A, rename the unit 10A and store the new name in memory, and transmit the data to a personal computer or other computing device for performing certain waypoint management functions. Moreover, as the GPS unit 10A continues to move and transmit new location data to the unit 10, the unit 10 not only provides an updated indication of the new location of the unit 10A but also automatically considers the updated location data when performing the navigation and waypoint management functions discussed above.

Updated location data received by the GPS unit is stored in such a way that it may be accessed by the navigation algorithms and waypoint functions of the GPS unit, not merely displayed. Accordingly, the present invention provides for updatable and more usable location data for moving waypoints, not just static location data.

There are many practical applications which could utilize the advantages of the present invention. For example, if a family or other group of people is camping or hiking and each person is carrying a GPS/radio unit, then everyone can communicate with one another and see where everyone else is located. Also, because each user's unit can calculate and display a route that permits them to follow or go to another user, all the members of a group can easily follow one another and go to a member who becomes lost or injured, even if the lost or injured person continues to move. For example, a group of hikers or mountain climbers may use units constructed in accordance with the present invention to follow the path of a lead person and quickly go to anyone who needs help. The present invention may also be useful in law enforcement applications. For example, a police officer may use the unit 10 to obtain an intercept route that may be followed to go to or meet another police officer who is in pursuit of a fleeting criminal.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A portable GPS unit comprising:
   a GPS receiver for receiving satellite signals from a plurality of satellites;
   a radio receiver operable for receiving location data indicative of a location of a moving waypoint;
   a processor coupled with the GPS receiver and the radio receiver for calculating a route that may be traveled by the GPS unit to go to an estimated future location of the moving waypoint as a function of the satellite signals and the location data; and
   a display coupled with the processor for displaying the route.

2. The portable GPS unit as set forth in claim 1, the processor being further operable for recalculating the route as the GPS unit and the moving waypoint move relative to one another.

3. The portable GPS unit as set forth in claim 1, the processor being further operable for estimating the route based upon a heading of the moving waypoint.

4. The portable GPS unit as set forth in claim 1, the processor being further operable for estimating the route based upon a speed of the moving waypoint.

5. The portable GPS unit as set forth in claim 1, the processor being further operable for estimating the route based upon a heading and a speed of the moving waypoint.

6. The portable GPS unit as set forth in claim 1, the moving waypoint comprising another portable GPS unit.

7. The portable GPS unit as set forth in claim 6, the radio receiver comprising a radio transceiver further operable for transmitting voice communications to and receiving voice communications from the other GPS unit over a wireless radio network.

8. The portable GPS unit as set forth in claim 1, further comprising a memory coupled with the processor.

9. The portable GPS unit as set forth in claim 1, wherein cartographic data may be stored in the memory and displayed on the display.

10. The portable GPS unit as set forth in claim 7, wherein the wireless radio network is selected from the group consisting of a Family Radio Service (FRS) network, a cellular radio network, and a personal communications service (PCS) network.

11. A portable GPS/radio unit capable of communicating with at least one other portable GPS/radio unit over a wireless radio network, the GPS/radio unit comprising:
    a GPS receiver for receiving satellite signals from a plurality of satellites;
    a processor coupled with the GPS receiver for calculating a location of the GPS/radio unit as a function of the satellite signals;
    a radio transceiver coupled with the processor and operable for transmitting a radio signal to the other GPS/radio unit indicative of the location of the GPS/radio unit and receiving from the other GPS/radio unit a radio signal indicative of a location of the other GPS/radio unit;
    the processor being further operable for determining a route that may be traveled by the GPS/radio unit to go to an estimated future location of the other GPS/radio unit, wherein the route is determined based on cartographic data stored in a memory coupled with the processor of the GPS/radio unit; and
    a display coupled with the processor and operable for displaying an indication of the location of the GPS/radio unit, an indication of the location of the other GPS/radio unit, and an indication of the route.

12. The portable GPS/radio unit as set forth in claim 11, the radio transceiver being further operable for transmitting voice communications to and receiving voice communications from the other GPS/radio unit.

13. The portable GPS/radio unit as set forth in claim 11, wherein the wireless radio network is selected from the group consisting of a Family Radio Service (FRS) network, a cellular radio network, and a personal communications service (PCS) network.

14. A method of providing a route that may be followed by a first moving GPS unit to go to or follow a second moving GPS unit, the method comprising the steps of:
    receiving at the first moving GPS unit satellite signals from a plurality of GPS satellites;
    calculating a location of the first moving GPS unit as a function, of the satellite signals;
    receiving at the first moving GPS unit location data from the second moving GPS unit indicative of a location of the second moving GPS unit;
    determining a route between the first moving GPS unit and an estimated future location of the second moving GPS unit based on the location of the first moving GPS unit and the location of the second moving GPS unit; and
    displaying the route on a display of the first moving GPS unit.

15. The method as set forth in claim 14, further comprising the step of periodically recalculating the route to account for relative movement between the first moving GPS unit and the second moving GPS unit.

16. The method as set forth in claim 14, further comprising the step of estimating the route based on a heading of the second moving GPS unit.

17. The method as set forth in claim 14, further comprising the step of estimating the route based on a speed of the second moving GPS unit.

18. The method as set forth in claim 14, further comprising the step of estimating the route based on a heading and a speed of the second moving GPS unit.

19. The method as set forth in claim 14, further comprising the step of displaying cartographic data on the display of the first moving GPS unit.

20. The method as set forth in claim 14, further including the step of receiving at the first moving GPS unit voice communications from the second moving GPS unit transmitted over a wireless radio network.

21. The method as set forth in claim 20, wherein the wireless radio network is selected from the group consisting of a Family Radio Service (FRS) network, a cellular radio network, and a personal communications service (PCS) network.

22. A GPS system comprising:
a first GPS/radio unit including
a GSP receiver for receiving satellite signals from a plurality of satellites,
a processor coupled with the GPS receiver for calculating a location of the first GPS/radio unit as a function of the satellite signals, and
a radio transceiver coupled with the processor and operable for transmitting a radio signal indicative of the location of the first GPS/radio unit and receiving a radio signal indicative of a location of at least one other GPS/radio unit; and
a second GPS/radio unit including
a GPS receiver for receiving satellite signals from a plurality of satellites,
a processor coupled with the GPS receiver for calculating a location of the second GPS/radio unit as a function of the satellite signals, and
a radio transceiver coupled with the processor and operable for transmitting a radio signal to the first GPS/radio unit indicative of the location of the second GPS/radio unit and receiving from the first GPS/radio unit a radio signal indicative of a location of the first GPS/radio unit,
the processor of the first GPS/radio unit being further operable for calculating a route that may be traveled by a user to go to an estimated future location of the second GPS/radio unit, the first GPS/radio unit further including a display coupled with the processor and operable for displaying the route.

23. The GPS system as set forth in claim 22, the processor of the first GPS unit being further operable for periodically recalculating the route.

24. The GPS system as set forth in claim 22, the processor of the first GPS unit being further operable for estimating the route based upon a heading of the second GPS unit.

25. The GPS system as set forth in claim 22, the processor of the first GPS unit being further operable for estimating the route based upon a speed of the second GPS unit.

26. The GPS system as set forth in claim 22, the processor of the first GPS unit being further operable for estimating the route based upon a heading and a speed of the second GPS unit.

27. The GPS system as set forth in claim 22, the radio transceiver being further operable for transmitting voice communications to and receiving voice communications from the second GPS unit over a wireless radio network.

28. The GPS system as set forth in claim 22, the first and second GPS unit each further comprising a memory coupled with the processor.

29. The GPS system as set forth in claim 28, wherein cartographic data may be stored in the memory.

30. The GPS system as set forth in claim 27, wherein the wireless radio network is selected from the group consisting of a Family Radio Service (FRS) network, a cellular radio network, and a personal communications service (PCS) network.

31. A portable GPS/radio unit comprising:
a GPS receiver for receiving satellite signals from a plurality of satellites;
a radio receiver for receiving location data indicative of a location of a movable waypoint; and
a processor coupled with the GPS receiver and with the radio receiver and operable to determine a heading and a speed of the movable waypoint and, based thereon, to determine a route that may be traveled by a user of the UPS/radio unit to go to an anticipated future location of the movable waypoint.

32. A portable GPS/radio unit comprising:
a GPS receiver for receiving satellite signals from a plurality of satellites;
a radio receiver for receiving location data indicative of a location of a movable waypoint;
a display;
a memory containing cartographic information, including information about any fixed obstacles; and
a processor coupled with the GPS receiver, the radio receiver, the display, and the memory, and operable to determine a heading and a speed of the movable waypoint and, based thereon, to determine a route that may be traveled by a user of the GPS/radio unit to go to an anticipated future location of the movable waypoint, wherein the route accounts for the any fixed obstacles, and to present the route on the display.

33. A portable GPS/radio unit comprising:
a GPS receiver for receiving satellite signals from a plurality of satellites;
a processor coupled with the GPS receiver for calculating a location of the GPS/radio unit as a function of the satellite signals;
a radio transceiver coupled with the processor and operable for transmitting a radio signal directly to a movable waypoint indicative of the location of the GPS/radio unit and receiving directly from the movable waypoint a radio signal indicative of a location of the movable waypoint;
the radio transceiver being further operable to transmit and receive voice communication directly to and from the movable waypoint;
the processor being further operable to calculate a heading and a speed of the movable waypoint, an estimated future location of the movable waypoint based on the location, heading, and speed of the movable waypoint, and a route that may be traveled by the GPS/radio unit to the estimated future location of the movable waypoint in order to intercept the movable waypoint at the estimated future location of the movable waypoint;
the processor being further operable to recalculate the heading and speed of the movable waypoint and the route to account for movement of the GPS/radio unit, the recalculated heading and speed of the movable waypoint, and any fixed obstacles along the route;
a display coupled with the processor and operable for displaying an indication of the location of the GPS/ radio unit, an indication of the location of the movable waypoint, and an indication of the route; and wherein the movable waypoint is another portable GPS/radio unit.

34. A portable GPS unit comprising:

a GPS receiver for receiving satellite signals from a plurality of satellites;

a radio receiver operable for receiving location data indicative of a location of a moving waypoint;

a processor coupled with the GPS receiver and the radio receiver for calculating a route that may be traveled by the GPS unit to follow the moving waypoint as the moving waypoint moves; and a display coupled with the processor for displaying the route.

* * * * *